W. F. ASH.
ROCK DRILL.
No. 8,916.  Patented May 4, 1852.
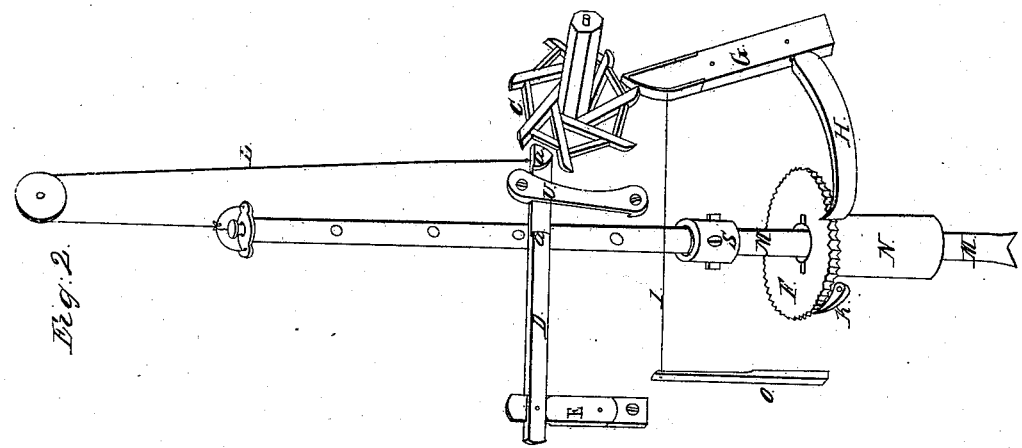
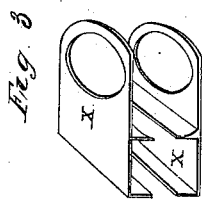
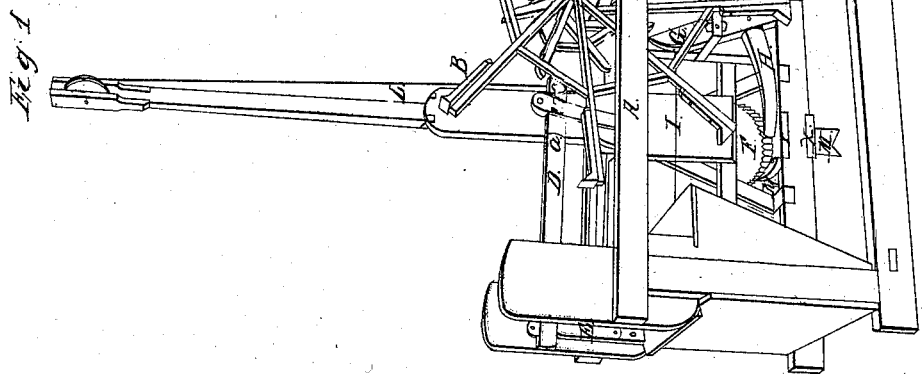

UNITED STATES PATENT OFFICE.

WM. F. ASH, OF SPRINGFIELD, OHIO.

ROCK-DRILL.

Specification of Letters Patent No. 8,916, dated May 4, 1852.

*To all whom it may concern:*

Be it known that I, WILLIAM F. ASH, of Springfield, in the county of Clark and State of Ohio, have invented a new and useful Improvement in Rock-Drills Employed in Boring for Water; and I do hereby declare that the following is a full and exact description of the construction and operation of the same, reference being had to the annexed drawings, making a part of this specification, in which—

Figure 1. is a perspective view, Fig. 2, a view of the improvement, together with the auger, and Fig. 3, a view of the plates through which the auger passes, and which hold it in position.

I construct my machine as in Fig. 1, in which A, represents the frame, B, the tread wheel, C, a cam wheel, D, a lever to which the auger chain or rope is fastened, E, the joint of the lever, F, a ratchet wheel, which fits on a sleeve, as shown in Fig. 2, G, another lever, H a feed hand, I, a small rope, or wire attached to the lever G, and also to a spring as shown in Fig. 2, K, a pawl or catch which holds the ratchet wheel, L, the rope or chain which raises the auger, and M the lower part of the auger.

When the tread wheel is pressed, the cams revolve and act on the lever D, which lifts the auger to the required height, while the lever G, which is worked by the same cams, and also by a spring, as in Fig. 2, drives the feed hand H, which acts on the ratchet wheel F, and thus gives a regular revolving motion to the drill or auger, to prevent its getting fast—said ratchet wheel being held in the meantime by the catch K.

The apparatus for lifting and turning the auger may be more clearly seen in Fig. 2. A movable collar S, is fitted to the auger and held to its place by a screw. This collar enters the ratchet wheel, and works in the sleeve to which said wheel is attached—the whole being connected by means of projections which slide in grooves in said sleeve, so as to cause the auger to revolve with said ratchet wheel.

The use of the lever D, as worked by the cams, prevents the jar which is otherwise occasioned by the descent of the auger; while by means of the lever G (which is driven by the same cams) combined with the collar, sleeve, and ratchet wheel, the labor of one man is saved, and a more regular motion is given to the auger in its revolutions. The lever D, is hung on a jointed arm or upright E and has rounded shoulders $a$, $a'$ cut thereon, which come up against the stationary guide U, as the lever is raised up and drawn forward toward the cam wheel, by the weight of the drill, and is forced down, and back from the cam wheel, by the action of the cams. It will be perceived that, by thus jointing the upright E, the lever D, will have two sets of motions—one up and down, to lower and raise the drill, and a backward and forward swinging motion, to clear itself of the cam wheel. For while the cam wheel is moving around, the lever sinks, and the point thereof upon which the cam bears, follows the cam concentrically until the shoulder $a'$, on said lever is brought up against the guide U, when the cam leaves the point of the lever and it trips, and the drill falls. By the falling of the drill, the lever is again raised up and forward toward the cam wheel in position for the next operation, thus giving to the machine a free and easy motion without noise or jarring of the moving parts. The plates X, X, Figs. 1 and 3, are guides to the drill, which passes through the holes therein. By this construction also, the machine may be worked by steam, by horse power, or any other motor, the number of cams being regulated by the velocity.

Having thus fully described the construction of my machine, what I claim therein as my invention, and desire to secure by Letters Patent is,

In combination with the cam wheel C, and guide U, the hanging of the lever by which the drill is raised, on a jointed arm, so as to give it two sets of motions viz: up and down, to lower and raise the drill, and a backward and forward motion from and toward the cam wheel, to operate the machine without noise or jar, the whole being arranged substantially in the manner, and for the purpose specially set forth and described.

W. F. ASH.

Witnesses:
A. B. STOUGHTON,
N. B. HOWSON.